(12) United States Patent
Nakagawa (10) Patent No.: US 12,024,041 B2
(45) Date of Patent: Jul. 2, 2024

(54) V2V CHARGE MAPPING (71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 616 days.

(21) Appl. No.: 17/321,316

(22) Filed: May 14, 2021

(65) Prior Publication Data

US 2022/0363157 A1    Nov. 17, 2022

(51) Int. Cl.
| B60L 53/53 | (2019.01) |
| B25J 9/16 | (2006.01) |
| B60L 53/57 | (2019.01) |
| B60W 60/00 | (2020.01) |
| G01C 21/34 | (2006.01) |
| G05D 1/00 | (2006.01) |

(52) U.S. Cl.
CPC ............ *B60L 53/53* (2019.02); *B25J 9/1679* (2013.01); *B60L 53/57* (2019.02); *B60W 60/0023* (2020.02); *G01C 21/3407* (2013.01); *G05D 1/0088* (2013.01); *G05B 2219/50391* (2013.01)

(58) Field of Classification Search
CPC .... B60L 53/14–18; B60L 53/57; H02J 7/342; H04W 4/44–46
See application file for complete search history.

(56) References Cited

U.S. PATENT DOCUMENTS

| 9,260,024 | B1* | 2/2016 | Lau .................. B60L 53/66 |
| 2011/0025267 | A1* | 2/2011 | Kamen ............. B60L 53/665 |
| | | | 320/109 |
| 2018/0086212 | A1* | 3/2018 | Dudar ............... B60L 53/12 |
| 2019/0001833 | A1* | 1/2019 | Coburn ............. B60L 53/66 |
| 2019/0047427 | A1* | 2/2019 | Pogorelik ........ G06Q 20/405 |
| 2019/0130751 | A1* | 5/2019 | Mizutani ........... G08G 1/148 |
| 2019/0132719 | A1* | 5/2019 | Mizutani ........... B60L 53/60 |
| 2019/0132720 | A1* | 5/2019 | Mizutani ........... B60L 53/37 |
| 2019/0381910 | A1* | 12/2019 | Akhavan-Tafti ... B60L 53/65 |
| 2020/0148070 | A1* | 5/2020 | Takebayashi ...... B60L 53/16 |
| 2020/0231059 | A1* | 7/2020 | Hishida ............. H02J 3/322 |
| 2020/0282857 | A1* | 9/2020 | Mortensen ........ B60L 53/16 |

(Continued)

*Primary Examiner* — Dale Moyer
(74) *Attorney, Agent, or Firm* — Snell & Wilmer LLP (57) ABSTRACT A system for electrical charging of a first vehicle by a second vehicle includes a network access device to communicate with a first source that includes at least one of the first vehicle or a mobile device associated with a user of the first vehicle. The system further includes a processor coupled to the network access device that is designed to receive a charge request from the first source via the network access device, the charge request requesting access to a source of electrical energy for charging the first vehicle. The processor is further designed to identify an available vehicle that is available to be used as the source of electrical energy for charging the first vehicle. The processor is further designed to control the network access device to transmit available vehicle information corresponding to the available vehicle to the first source in response to receiving the charge request.

20 Claims, 6 Drawing Sheets (56) References Cited

U.S. PATENT DOCUMENTS

2020/0317067 A1* 10/2020 Miller .................... H02J 50/80
2021/0291692 A1*  9/2021 Masoud ................. H02J 50/10
2022/0097540 A1*  3/2022 Atluri ................... H02J 7/0048
2022/0258642 A1*  8/2022 Salter .................... B60L 53/14

* cited by examiner

V2V CHARGE MAPPING

BACKGROUND

1. Field

The present disclosure relates to systems and methods for charging a first vehicle by one of a plurality of additional vehicles.

2. Description of the Related Art

Electric vehicles are becoming more ubiquitous on the roads. These vehicles may provide significant advantages over conventional gas engine vehicles such as reduced emissions, increased acceleration, and the like. Some electric vehicles include an additional source of electricity such as a gas engine and a generator to convert power from the gas engine into electricity, or a fuel cell stack that converts hydrogen and oxygen into electricity. Vehicles without this additional energy source have a disadvantage in that their range is limited by the capacity of the on-board battery.

Advances are being made in charging technology to increase charging rate. Likewise, more electric charging stations are being installed daily. However, the amount of time for a typical recharge may be relatively great, and there still exists a relatively large swath of land that is without electric charging stations. In that regard, it is desirable to provide additional sources of electricity for electrical vehicles to access.

Thus, there is a need in the art for increasing availability of sources of electricity usable to charge electric vehicles.

SUMMARY

Described herein is a system for electrical charging of a first vehicle by a second vehicle. The system includes a network access device configured to communicate with a first source that includes at least one of the first vehicle or a mobile device associated with a user of the first vehicle. The system further includes a processor coupled to the network access device. The processor is designed to receive a charge request from the first source via the network access device, the charge request requesting access to a source of electrical energy for charging the first vehicle. The processor is further designed to identify an available vehicle that is available to be used as the source of electrical energy for charging the first vehicle. The processor is further designed to control the network access device to transmit available vehicle information corresponding to the available vehicle to the first source in response to receiving the charge request.

Also disclosed is a system for electrical charging of a first vehicle. The system includes a battery having a state of charge (SOC) and configured to receive electrical energy. The system further includes a network access device configured to communicate with a remote server. The system further includes an electronic control unit (ECU) coupled to the battery and the network access device and configured to transmit a charge request to the remote server requesting access to a source of electrical energy for charging the battery, and to receive available vehicle information corresponding to an available vehicle that is available to be used as the source of electrical energy for charging the battery.

Also disclosed is a method for electrical charging of a first vehicle by a second vehicle. The method includes receiving, by a network access device and from a first source that includes at least one of the first vehicle or a mobile device associated with a user of the first vehicle, a charge request requesting access to a source of electrical energy for charging the first vehicle. The method further includes identifying, by a processor, an available vehicle that is available to be used as the source of electrical energy for charging the first vehicle. The method further includes controlling, by the processor, the network access device to transmit available vehicle information corresponding to the available vehicle to the first source in response to receiving the charge request.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for charging of an electric vehicle by another electric vehicle. The systems provide various benefits and advantages such as providing many vehicles the opportunity to receive electrical energy from many locations. This advantageously significantly increases a range in which electric vehicles can travel because each vehicle in the network may function as a charging station. The systems further provide the advantage of allowing vehicles to transfer electricity to other vehicles to earn money for the electricity. The systems advantageously allow for autonomous charging of the various vehicles, which beneficially allows a vehicle to be charged without a vehicle user taking time from other tasks to complete the charge. The systems also advantageously include a wireless charger (or robot arm coupled to charging contacts) to allow for relatively easy transfer of electricity without requiring cables coupled between vehicles.

An exemplary system includes a server having a processor and a memory. The memory may store vehicle information from multiple vehicles including a state of charge (SOC) of the vehicles, locations of the vehicles, or the like. The memory may also store preference data corresponding to preferences of vehicles that are requesting electrical energy. The processor may receive a charge request from one of the vehicles corresponding to a request to receive electrical energy. The processor may then determine which vehicles are available to provide the charge based on the vehicle information. The processor may select and transmit one of the available vehicles as a charging vehicle, and may transmit information corresponding to the charging vehicle to the requesting vehicle to facilitate charging of the requesting vehicle by the charging vehicle.

Figure 1:
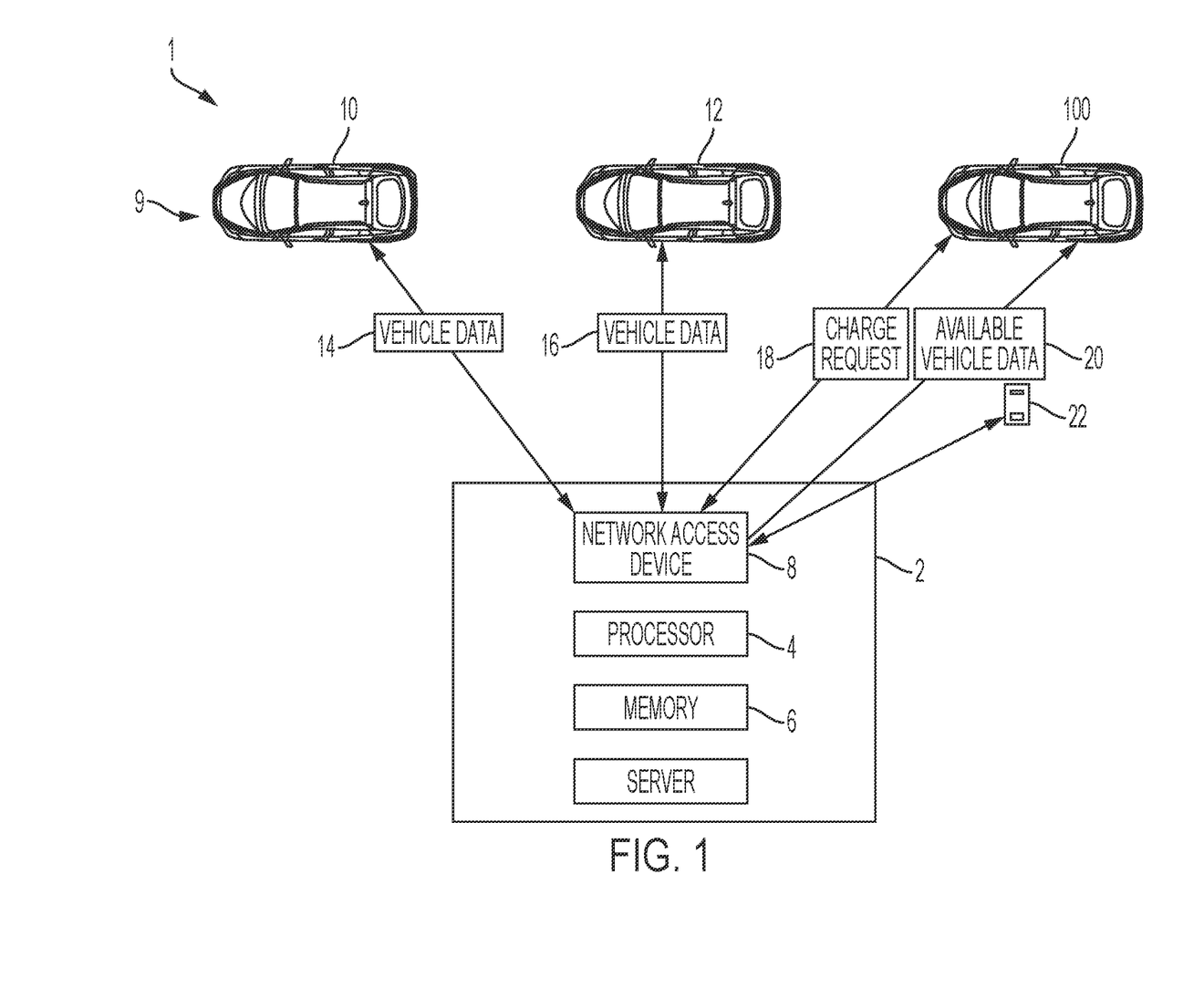
FIG. 1 is a block diagram illustrating a system for electric charging of a first vehicle by a second vehicle according to an embodiment of the present invention.

Referring now to FIG. 1, a system 1 for electrical charging of a first, or requesting, vehicle by a second, or available, vehicle is shown. The system 1 includes a server 2, a plurality of vehicles 9, and one or more mobile device 22. The server 2 includes a processor 4, a memory 6, and a network access device 8.

The server 2 may be a cloud server or a dedicated server, and may be hosted in a single location or may be distributed across multiple locations. The server 2 may include redundant capabilities to ensure continuous operation.

The processor 4 may include one or more logic devices such as one or more of a central processing unit (CPU), an accelerated processing unit (APU), a digital signal processor (DSP), a field programmable gate array (FPGA), an application specific integrated circuit (ASIC), or the like. The memory 6 may include any non-transitory memory 6 known in the art. The memory 6 may store instructions usable by the processor 4 to perform operations (i.e., may store specific program instructions for the processor 4 to perform the various actions described herein). The memory 6 may also or instead store other data as instructed by the processor 4 such as storing received vehicle data or vehicle locations received from the plurality of vehicles 9.

The network access device 8 may include any network access device capable of communicating via a wireless protocol. For example, the network access device 8 may communicate via Bluetooth, Wi-Fi, a cellular protocol, vehicle to vehicle (V2V) communications, Zigbee, or any other wireless protocol. The network access device 8 may communicate (i.e., transmit and/or receive data) with respective network access devices of the plurality of vehicles 9 and the mobile devices 22.

The vehicles 9 may include any vehicles which utilize electrical energy to generate propulsion. For example and as described in further detail below, the vehicles 9 may include a battery that stores electrical energy and a motor-generator that converts stored electrical energy into rotational power (i.e., torque).

The vehicles 9 may include, for example, a first vehicle 10, a second vehicle 12, and a third vehicle 100. Some or all of the vehicles 9 may transmit vehicle data to the server 2 via the network access device 8. For example, the first vehicle 10 may transmit first vehicle data 14 to the server 2 and the second vehicle may transmit second vehicle data 16 to the server 2. The first vehicle data 14 and the second vehicle data 16 may include, for example, a current location of the respective vehicle 9, a current state of charge (SOC) of a battery of the respective vehicle 9, or whether the respective vehicle 9 is a self-charging vehicle (e.g., whether it includes fuel cells or gas and a generator to generate electricity, or whether it is a pure electric vehicle), or the like. The vehicle data 14, 16 may further include account information associated with the respective vehicle such as corresponding to a charge account (which may include credit card or bank account information) or a loyalty account (which may include a quantity of loyalty points associated with the account). The vehicle data 14, 16 may also include preference data including a minimum SOC to which the owner of the respective vehicle 9 is willing for the respective vehicle 9 to be depleted. The preference data may also include a desired price at which it will sell electrical energy or a range of dates or times during which the respective vehicle 9 is available to provide electrical energy. The preference data may also include a geographical area in which the respective vehicle 9 is willing to travel to provide electrical energy.

From time to time, one of the vehicles 9 may be away from a charging station and may desire to increase its SOC. In that regard, any of the vehicles 9 associated with the system 1 (or even vehicles unassociated with the system 1) may receive electrical energy from another vehicle 9 of the system 1. For example, the vehicle 100 may transmit a charge request 18 to the server 2. The charge request 18 may include various information such as a current SOC of the vehicle 100, a desired amount of electrical energy, a current location of the vehicle 100, a price that an owner of the vehicle 100 is willing to pay for electrical energy, a current range of the vehicle 100, a geographical area in which the vehicle 100 is willing to travel for the electrical energy, a direction of travel of the vehicle 100, or the like.

The server 2 may receive the charge request 18 and may select one or more of the remaining vehicles 9 as available vehicles that meet the criteria of the charge request 18. For example, if the charge request 18 requests 3 kilowatt-hours of electrical energy then the server 2 may select any of the vehicles 9 that have at least that much energy to provide as available vehicles. In some embodiments, the server 2 may select an optimal available vehicle and may transmit available vehicle data corresponding to the optimal available vehicle to the vehicle 100. In some embodiments, the server 2 may select multiple available vehicles and may transmit available vehicle data 20 corresponding to each of the multiple available vehicles to the vehicle 100. In some embodiments, the vehicle 100 (or a user of the vehicle 100) may select a selected available vehicle based on the available vehicle data 20 and may transmit the selected available vehicle to the server 2.

The server 2 may then transmit additional available vehicle data 20 to the vehicle 100 (or a mobile device 22 associated with a user of the vehicle 100) which may include a current location of the selected vehicle, digital key information corresponding to the selected vehicle, navigation instructions to the selected vehicle, or the like. In some embodiments, the vehicle 100 may be autonomous and therefore capable of autonomously traveling to the location of the selected vehicle and autonomously obtaining the electrical energy from the selected vehicle. For example, the vehicle 100 may include a robot arm to actuate a charging contact to become in contact with the vehicle from which the electrical energy will come. Thus, the vehicle 100 may be capable of recharging while its user is busy performing another task such as working, cooking, or the like.

Figure 2:
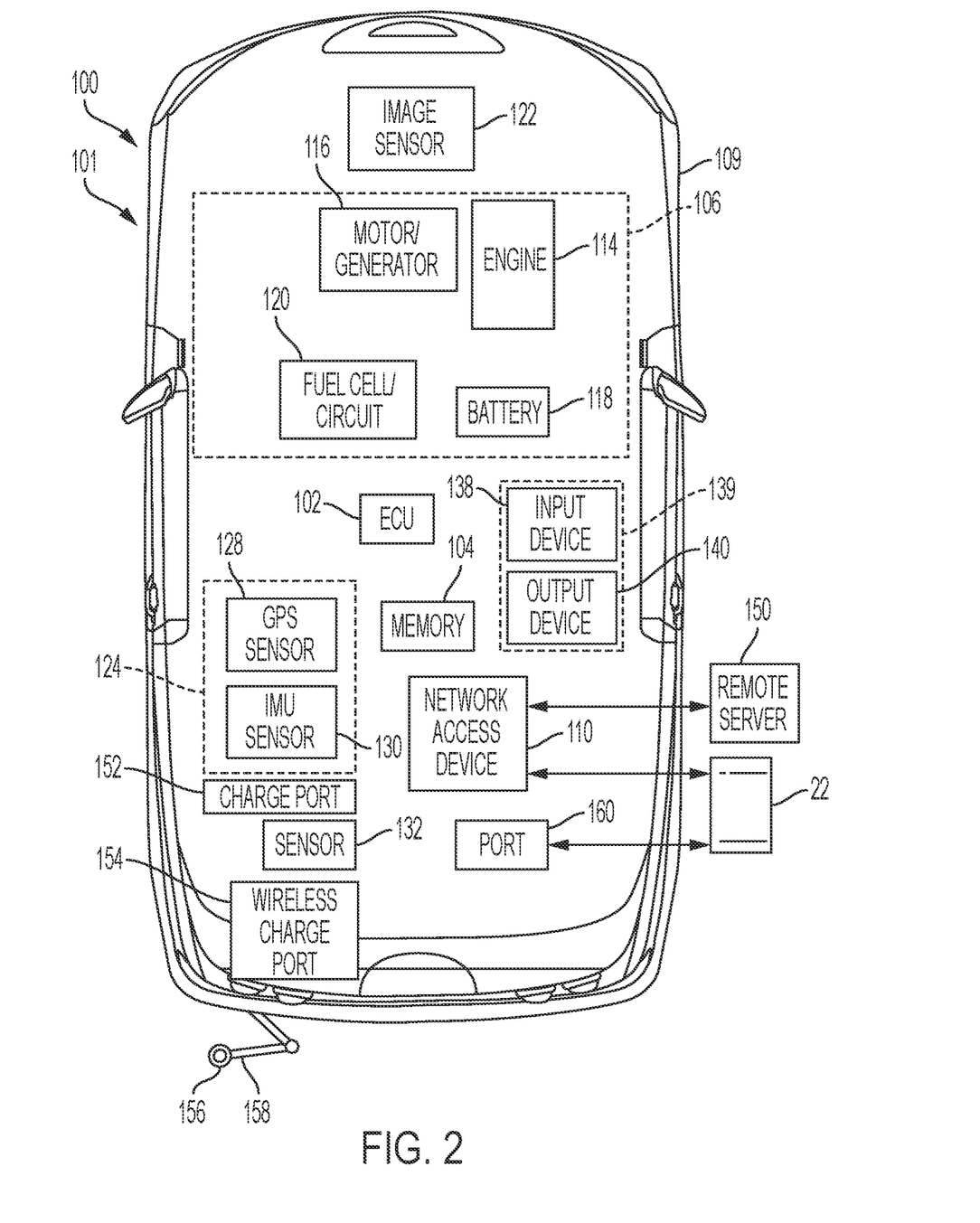
FIG. 2 is a block diagram illustrating a vehicle and a system for electric energy transfer between the vehicle and another vehicle according to an embodiment of the present invention.

Turning to FIG. 2, additional details of the vehicle 100 are shown. The vehicle 100 may include a system 101 for obtaining electrical charge from another vehicle. The vehicle 100 (or system 101) may include an ECU 102, a memory 104, a power source 106, and a main body 109. The vehicle 100 (or system 101) may further include a network access device 110, an image sensor 122, a location sensor 124, and a sensor 132. The vehicle 100 may also include an input device 138 and an output device 140, which together may be referred to as the IVI interface 139. The vehicle 100 may further include a charge port 152, a wireless charge port 154, a charging contact 156, a robot arm 158, and a port 160.

The main body 109 may be propelled along a roadway, may be suspended in or on water, or may fly through air. The main body 109 may resemble a vehicle such as a car, a bus, a motorcycle, a boat, an aircraft, or the like. The main body 109 may further support one or more individual such as a driver, a passenger, or the like. The main body 109 may define or include a vehicle cabin 111 in which a driver, passengers, or the like may be located.

The ECU 102 may be coupled to each of the components of the vehicle 100 and may include one or more processors or controllers which may be specifically designed for automotive systems. The functions of the ECU 102 may be implemented in a single ECU or in multiple ECUs. For example, the ECU 102 may include a power source ECU that controls the power source 106, an IVI ECU that controls the IVI interface 139, or the like. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination location. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality. The ECU 102 may also, for example, control charging of the vehicle 100 via the various charge ports 152, 154 and charging contact 156.

The memory 104 may include any non-transitory memory and may store data usable by the ECU 102. The memory 104 may be located in or on the main body 109 and may thus be referred to as a local memory. In some embodiments, the memory 104 may be located remote from the main body 109 and may thus be a remote memory (i.e., memory that is accessed from the cloud via the network access device 110).

The power source 106 may include any one or more of an engine 114, a motor-generator 116, a battery 118, and a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage devices including a battery, a flywheel, a super capacitor, a thermal storage device, or the like. The battery 118 may be used to store power usable by the motor generator 116, power usable to start the engine 114, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116 or other electrical components of the vehicle 100. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 124 may include any sensor capable of detecting data corresponding to a current location of the vehicle 100. For example, the location sensor 124 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 122 may be coupled to the main body 108 and may detect image data corresponding to an environment of the vehicle 100, data corresponding to the vehicle cabin 111, or the like. For example, the image sensor 122 may include a camera, a radar detector, a lidar detector, or any other image sensor capable of detecting light having any wavelength. The image sensor 122 may include one or multiple image sensors which may be oriented to detect image data in any direction relative to the main body 109 (and/or within the vehicle cabin 111). For example, the image sensor 122 may include four or more radar detectors to detect radar data on all four sides of the main body 109. The image sensor 122 may also or instead include a first camera to detect image data in a forward direction relative to the main body 109 and a second camera to detect image data in a rear direction relative to the main body 109.

The sensor 132 may include one or more of a sensor capable of detecting a status of a vehicle component, a sensor capable of detecting environmental conditions (including weather), or the like. For example, the sensor 132 may include a voltage sensor, a current sensor, a temperature sensor, a pressure sensor, a fuel gauge, an airflow sensor, an oxygen sensor, or the like. In that regard, the sensor 132 may detect data corresponding to the SOC of the battery 118, and the ECU 102 may calculate the SOC based on the detected data.

The input device 138 may include any one or more input device such as a button, a keyboard, a mouse, a touchscreen, a microphone, or the like. The input device 138 may receive input from a user of the vehicle 100 such as a driver or a passenger. The input device 138 may receive, for example, a desired destination for the vehicle 100, a calendar of the user, a desired SOC for the battery 118, or the like. The input device 138 may also receive information corresponding to an availability of the vehicle 100 to be used to charge other vehicles, a minimum allowable SOC of the battery 118, or the like.

The output device 140 may include any output device such as a speaker, a display, a touchscreen, or the like. The output device 140 may output data to a user of the vehicle. The output device 140 may, for example, output audio data indicating when the vehicle 100 will be away obtaining electrical energy, a current SOC of the battery 118, or the like.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wireless protocol. The network access device 110 may be referred to as a data communication module (DCM) and may communicate with any device on the vehicle 100 and/or any remote device. For example, the network access device 110 may communicate with the server 2 of FIG. 1, the mobile device 22, or the like.

The charge port 152 may receive electrical energy from a source external to the vehicle 100. For example, the charge port 152 may receive electrical energy from an electric charger or from a cable or other contact that is coupled to another vehicle (e.g., the vehicle 10 or 12 from FIG. 1).

The wireless charge port 154 may receive a wireless electronic power signal. For example, the wireless charge port 154 may receive the wireless electronic power signal via inductive charging. For example, the wireless charge port 154 may receive a wireless electronic power signal from another vehicle (e.g., the vehicle 10 or 12 from FIG. 1).

The charging contact 156 may be electronically coupled to the charge port 152 or otherwise coupled to the battery 118. In that regard, the charging contact 156 may contact another charging contact or charge port of another vehicle (e.g., the vehicle 10 or 12 from FIG. 1) to receive or transfer electrical energy.

The robot arm 158 may include any one or more actuator of any type. The robot arm 158 may be physically coupled to the charging contact 156 and may actuate the charging contact 156. In that regard, the robot arm 158 may actuate the charging contact 156 to make contact with a respective charging contact or charge port of another vehicle. For example, the ECU 102 may locate a respective charging contact of another vehicle via the image sensor 122 and may control the robot arm 158 to cause the charging contact 156 to contact a charging contact of the other vehicle.

The port 60 may include any wired or wireless port capable of communicating with an electronic device such as the mobile device 22. The port may, for example, receive digital key information from the mobile device 22 via a near-field communication (NFC) protocol. The port 160 may, in some embodiments, be considered part of the network access device 110.

Figure 3A:
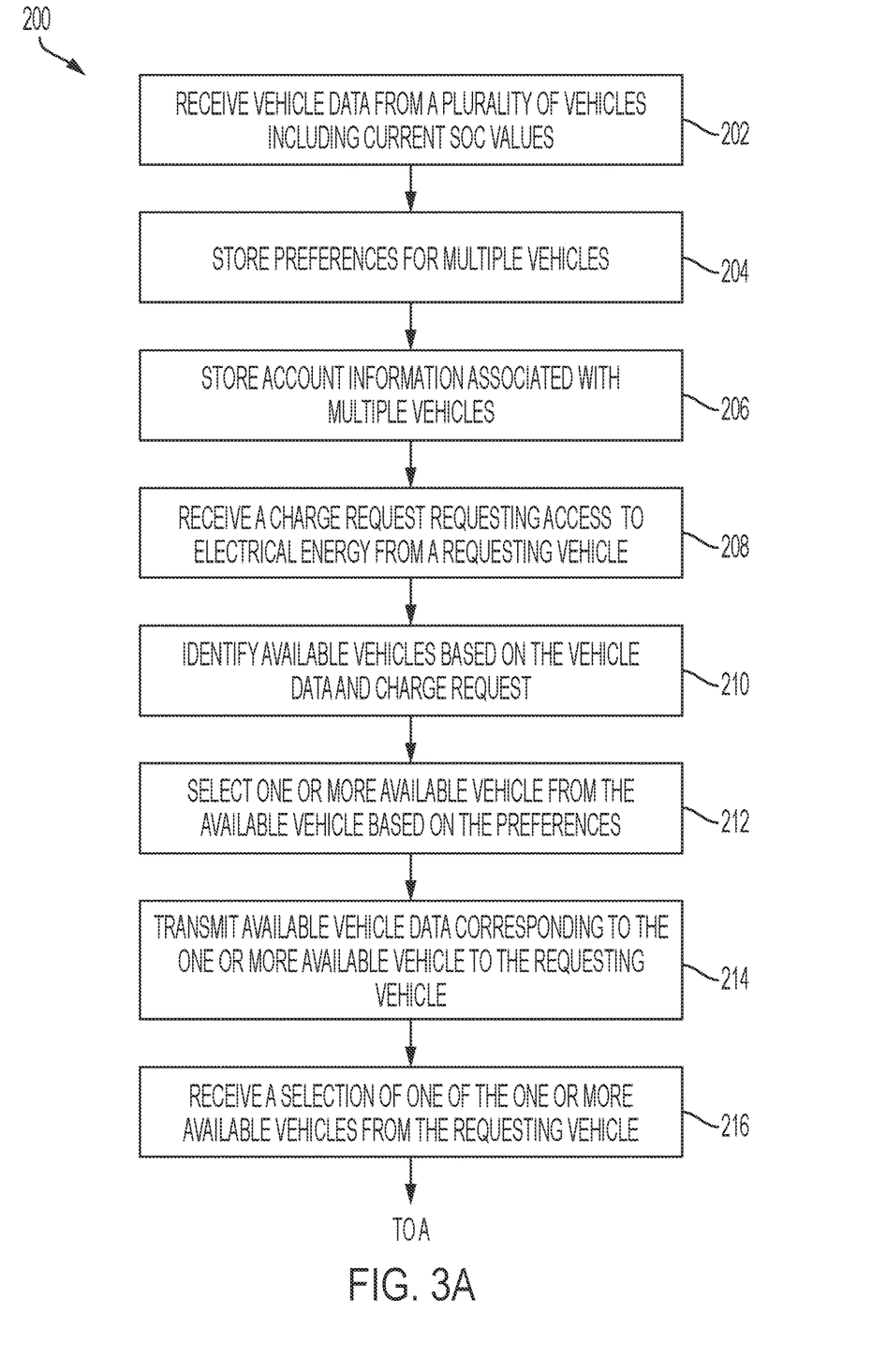
FIGS. 3A and 3B are flowcharts illustrating a method for electric charging of a first vehicle by a second vehicle according to an embodiment of the present invention.
Figure 3B:
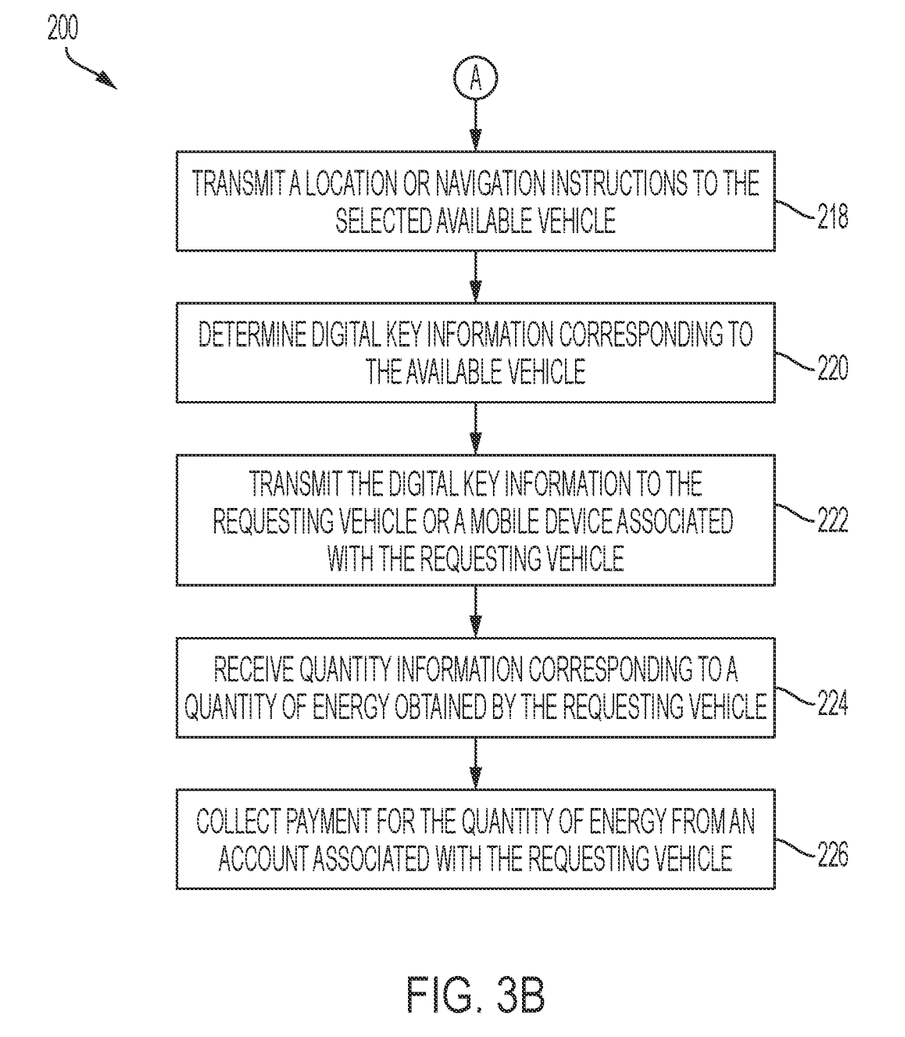

Referring now to FIGS. 3A and 3B, a method 200 for charging of a first (i.e., requesting) vehicle by a second (i.e., charging) vehicle is shown. The method 200 may be performed, for example, by components of a system such as the system 1 of FIG. 1 or the system 101 of FIG. 2.

In block 202, a server may receive vehicle data from a plurality of vehicles. For example, the vehicles may be part of a network and may all be associated with the network. In some embodiments, each of the vehicles may be registered as part of a membership network, may each be owned by a single rental car agency, may each be manufactured by a single manufacturer, or the like. For example, all vehicles manufactured by a particular manufacturer may be automatically registered in the network.

The vehicle data may include any of a plurality of items of information and may be provided by the vehicles periodically, upon a change of status of the vehicle, or the like. For example, the vehicle data may include a current location of the vehicle, a current SOC of the battery, a time and/or date range or period in which the vehicle is available to charge other vehicles, a minimum allowable SOC of the battery, a current amount of power to be provided to another vehicle, or the like. The vehicle data may further include, for example, whether the vehicle includes a source of electrical energy (e.g., whether it includes a generator that converts fuel to electricity or a fuel cell stack that generates electricity). The vehicle data may further include geographical area information corresponding to a geographical area which the vehicle is available to travel to charge another vehicle. The vehicle data may further include price information corresponding to a minimum price per unit of electrical energy an owner of the vehicle will accept as payment for electrical energy provided by the vehicle. The vehicle data may further include whether the vehicle is autonomous and capable of traveling autonomously to a location of another vehicle. The vehicle data may further include a speed of charging that the vehicle is capable of providing. The vehicle data may further include information indicating whether the vehicle is capable of providing electrical energy without a vehicle user being present (e.g., via an actuator, via wireless charging, or the like).

In block 204, a memory of the server may store preferences associated with at least some of the plurality of vehicles of the network. The preferences may include at least one of a portion of the vehicle information or additional information. For example, the preferences may include at least one of a minimum SOC, geographical area information in which the vehicle is available to travel to charge another vehicle, time information corresponding to times at which the vehicle is available to charge another vehicle, or cost information corresponding an amount of payment that each of the plurality of available vehicles will pay for each unit of the electrical energy. The preferences may also include whether a user of the vehicle prefers to travel with the vehicle to obtain a charge or whether the user prefers for such charging to be handled autonomously. The preferences may correspond to preferences of a vehicle user that is requesting a charge, while the vehicle data from block 202 may correspond to vehicle data associated with vehicles capable of providing electrical energy to other vehicles.

In block 206, the memory of the server may store account information associated with at least some of the plurality of vehicles of the network. This account information may include membership numbers or other membership identification corresponding to the network of vehicles. For example, each of the vehicles may be part of a loyalty program and may accumulate points or other rewards. The vehicles may use these points or rewards to pay for electrical energy from other vehicles. The account information may also or instead include credit, debit, checking, or other financial account information. This information may be used by the server to collect funds for payment for the electrical energy from other vehicles, may be used to pay funds to an account associated with vehicles from which electricity is provided, or the like.

In block 208, the server may receive a charge request from a requesting vehicle of the plurality of vehicles. The charge request may be received directly from the vehicle (i.e., via a network access device of the requesting vehicle), from a mobile device associated with a user of the vehicle (e.g., a mobile phone), or the like. The charge request may correspond to a request for access to electrical energy from a source (e.g., another vehicle of the plurality of vehicles (a charging vehicle)). The charge request may include various information such as, for example, a current location of the requesting vehicle, a route of the requesting vehicle, a destination of the requesting vehicle, or the like. The charge request may also or instead include an amount of money the requesting vehicle is willing to pay per unit of energy, an amount of energy the requesting vehicle is requesting, or the like. The charge request may also include information indicating whether the vehicle user is with the vehicle or whether autonomous charging is desired. The charge request may also include information indicating whether the requesting vehicle prefers to travel to the charging vehicle or vice versa. The charge request may come from a member of the network, or may come from another vehicle (e.g., a request may be made via an app or other cloud portal).

In block 210, the processor of the server may identify available vehicles that can meet the charge request based on the vehicle data from block 202, the preferences from block 204, the account information from block 206, the charge request from block 208, or the like. The processor may identify available vehicles that meet certain specifications from the charge request or from the vehicle preferences such as an amount of electrical energy to be received, a price per unit of energy, or the like. The processor may further identify available vehicles as one or more vehicle that is closest to a current location of the requesting vehicle, that results in a shortest amount of deviation from a current route of the requesting vehicle, or the like. The processor may further identify available vehicles as one or more vehicle capable of traveling to a current (or future) location of the requesting vehicle at a current or future time.

In some embodiments, the processor may select multiple available vehicles rather than a single available vehicle. In some embodiments and in block 212, the processor may narrow down the list of selected available vehicles based on the preferences from block 204 and based on the charge request. The processor may learn an importance of each of the preferences of a vehicle user based on interactions with the specific requesting vehicle, and may create a ranking system for the vehicle user based on the interactions. For example, the ranking system may learn that a user values speed of charging over all other factors, and may first select available vehicles as those with a maximum available charging speed. The ranking system may further learn that the second most important factor is reduced distance from a current location of the requesting vehicle, and may further select available vehicles based on this factor. The processor may continuously or periodically adjust the ranking system as more information is received. In some embodiments, the selection in block 212 may result in a single available vehicle and, in some embodiments, may result in multiple available vehicles. In some embodiments, the processor may not perform block 212 such that all vehicles from block 210 are considered selected available vehicles.

In block 214, the processor may transmit available vehicle data corresponding to the selected vehicle from block 212 (or the available vehicles from block 210) to the requesting vehicle (which may also or instead include transmitting to a mobile device associated with the requesting vehicle). The available vehicle data may include relatively little information or may include a significantly larger quantity of information. For example, the available vehicle data may include any of the vehicle data from block 202 such as current location of the available vehicle(s), an amount of electrical energy available from the available vehicle(s), a date and/or time that the available vehicle is available to provide the electrical energy, or the like.

As referenced above, the processor may transmit available vehicle data corresponding to multiple available vehicles to the requesting vehicle (or other device associated with the requesting vehicle). In that regard, an output device of the requesting vehicle (or a mobile device associated with the requesting vehicle) may output the available vehicle information such that a user of the requesting vehicle may review the available vehicle information. In block 216 and after reviewing the available vehicle information, an input device of the requesting vehicle (or mobile device) may receive a selection of one of the available vehicles, and this selection may be provided to the server. This selected vehicle may be referred to as the selected available vehicle. In some embodiments, the processor may select a single selected available vehicle such that block 216 is unnecessary. The single, resulting available vehicle that is used to provide electrical energy to the requesting vehicle may be referred to as a charging vehicle.

In block 218, the server may transmit a location of the selected available vehicle to the requesting vehicle. In some embodiments, the server may transmit a route (which may include navigation instructions) from a current location of the requesting vehicle to a current location of the selected available vehicle. In some embodiments, this information may have been provided with the available vehicle information. However, in some embodiments, the requesting vehicle may be requested to travel autonomously to the location of the selected available vehicle such that the server provides detailed instructions for such autonomous travel. In some embodiments, the requesting vehicle may determine such autonomous driving route information.

In block 220, the server may determine digital key information corresponding to the available vehicle. The digital key information may be stored in the memory (i.e., as part of the vehicle data) or may be generated for a single use. For example, once an available vehicle is selected for charging the requesting vehicle, the server may generate a single-use digital key that a user of the requesting vehicle (or the requesting vehicle in an autonomous fashion) may access the available vehicle to obtain electrical energy. In some embodiments, the digital key information may only be used to access a charge port of the available vehicle. That is, the available vehicle may include a separate lock that locks access to a charge port such that the digital key may be used to access the charge port. In some embodiments, the available vehicle may travel to the requesting vehicle. In such embodiments, the server may determine digital key information corresponding to the requesting vehicle instead of, or in addition to, the available vehicle.

In block 222, the server may transmit the determined digital key information to the requesting vehicle or to a mobile device associated with a user of the requesting vehicle. As referenced above, the digital key information may include a digital key that allows access to the charging vehicle (or to a portion of the charging vehicle). In some embodiments, the requesting vehicle may autonomously access the charge port of the charging vehicle (or vice versa) using the digital key information. In some embodiments, the server may transmit digital key information to the available vehicle (or to a mobile device associated with the available vehicle) to allow the available vehicle (or associated mobile device or user) to access the requesting vehicle. This allows the available vehicle (or a mobile device or user thereof) to access the charge port of the requesting vehicle.

In block 224, the server may receive quantity information from at least one of the requesting vehicle or the charging vehicle. The quantity information may correspond to a quantity of electrical energy that is transferred from the charging vehicle to the requesting vehicle. In some embodiments, the server may instruct the requesting vehicle regarding a quantity of energy that will be provided and, in some embodiments, the server may instruct the charging vehicle regarding how much electrical energy to provide. The amount of electrical energy may be determined by the server based on the charge request, based on the amount of electrical energy is available from the charging vehicle that results in the SOC of the charging vehicle remaining at or above a minimum SOC threshold, a destination or route length of the requesting vehicle, a distance to an official charging station, or the like.

In block 226, the server may collect a payment for the amount of electrical energy that is provided from the charging vehicle to the requesting vehicle. For example, this information may be collected using the account information that was previous received. The server may determine a cost for each unit of electricity based on at least one of the vehicle data of the charging vehicle, the cost information in the charge request or preferences, an average current cost of electricity, or the like. The server may also transmit the collected payment from an account associated with the requesting vehicle to an account associated with the charging vehicle.

Figure 4A:
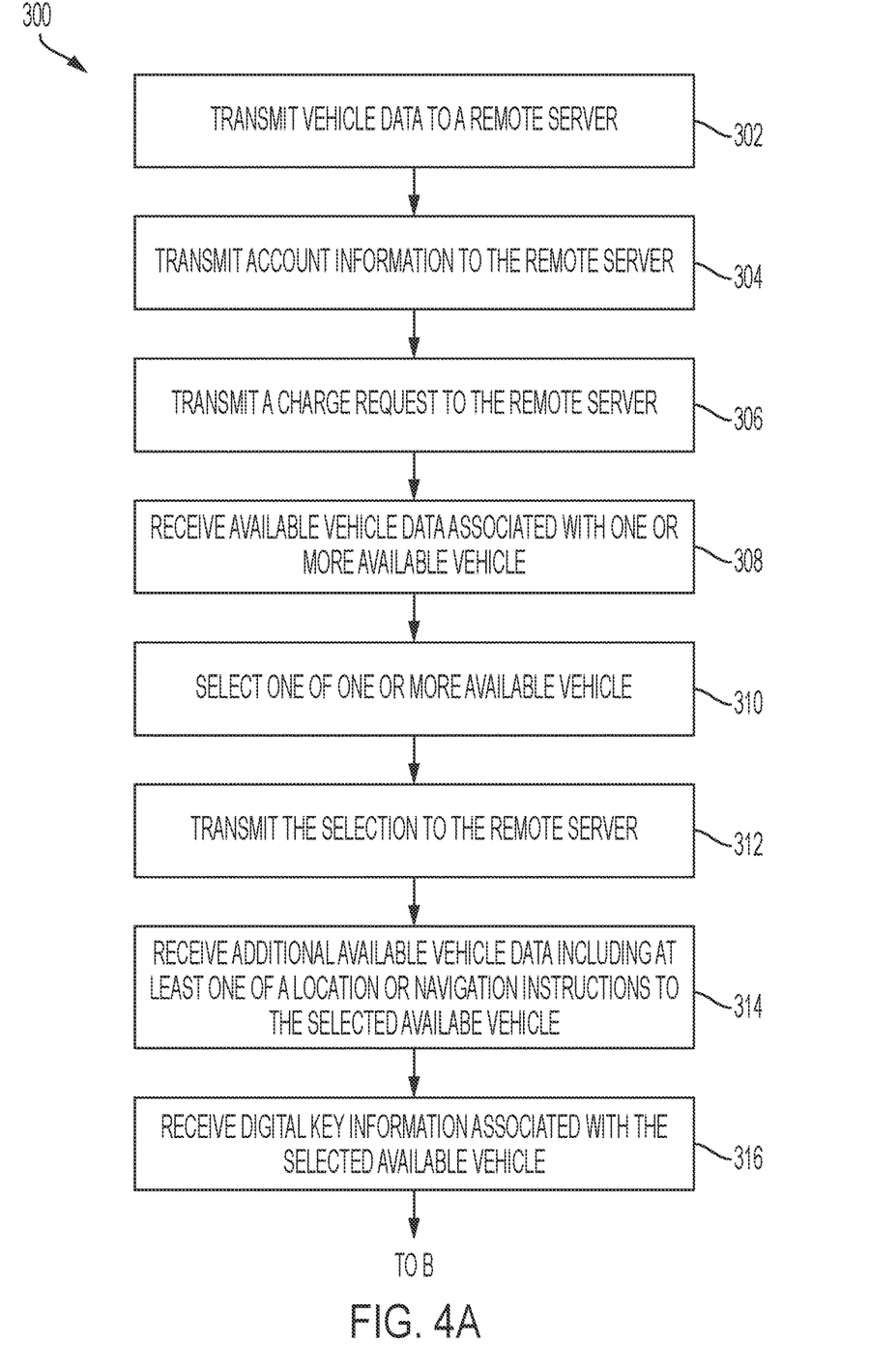
FIGS. 4A and 4B are flowcharts illustrating a method for electric energy transfer between a current vehicle and another vehicle according to an embodiment of the present invention.
Figure 4B:
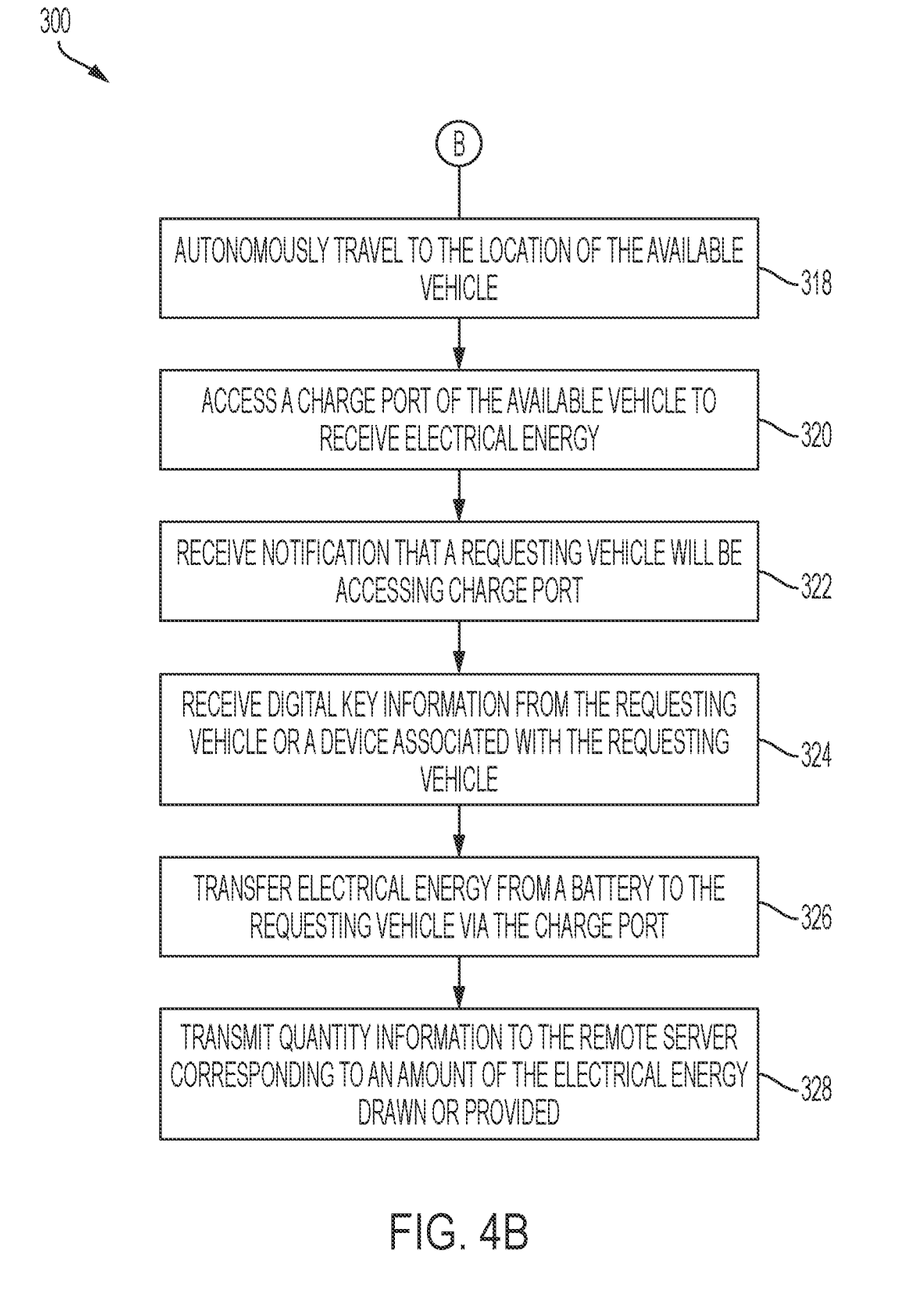

Referring now to FIGS. 4A and 4B, a method 300 for charging of a first, or requesting, vehicle is shown. The method 300 may be performed by a vehicle similar to the vehicle 100 of FIG. 2, any of the vehicles of the system 1 of FIG. 1A, any of the vehicles associated with the method 200 of FIGS. 3A and 3B, or the like.

The method 300 may begin in block 302 in which vehicle data is transmitted from a vehicle to a remote server. The vehicle data may include some or all of the vehicle data referred to above with reference to FIGS. 3A and 3B. For example, the vehicle data may include price information, a current location, a current SOC, a minimum SOC, an available date or time, or the like. The vehicle may also transmit preferences to the remote server. The vehicle data and preferences may be stored by the server as associated with the vehicle.

In block 304, the vehicle (or a mobile device associated with the vehicle) may transmit account information to the remote server. The account information may correspond to a loyalty account, a credit card account, a checking or debit account, or the like. The server may store this account information as associated with the vehicle.

In block 306, an input device of the vehicle (or a mobile device associated with a user of the vehicle) may receive a charge request from a user of the vehicle. The charge request provided by the vehicle user may include some or all of the information that the server in the method 200 of FIGS. 3A and 3B received, and the remaining information (e.g., route, destination, current SOC, or the like) may be provided by an ECU of the vehicle. The ECU may collect the information from the user charge request and may create a formal charge request to transmit to the server.

In some embodiments, the vehicle may determine to generate and transmit a charge request without user input. For example, the vehicle may determine that the user is at work and the next destination is the user's home. The vehicle may further determine that a current SOC is insufficient to reach the next destination (or another future destination). Based on this information, the vehicle may generate and transmit the charge request without user input. In some embodiments, the vehicle may generate the charge request and may request approval from the vehicle user prior to transmitting the charge request to the server. For example, the vehicle may determine that the user will have insufficient SOC to reach an upcoming destination and may ask the user if an additional charge is desired.

In block 308, the vehicle may receive available vehicle data from the server corresponding to one or more available vehicle. The available vehicle data may include any of the available vehicle data discussed above with reference to FIGS. 3A and 3B such as locations of the available vehicles, available electrical energy from the available vehicles, or the like. In some embodiments, the vehicle may output a portion or all of the available vehicle data via an output device of the vehicle or a mobile device associated with the user. In such embodiments, the driver may select one of the available vehicles as the charging vehicle.

In some embodiments and in block 310, the vehicle may select the charging vehicle from the available vehicles based on stored preference data associated with the user. For example, the vehicle may select a charging vehicle based on current locations, SOC of the current vehicle, available energy from the available vehicles, an available charging speed of the available vehicles, or the like.

In block 312, the vehicle (or a mobile device associated with the vehicle user) may transmit the selection of the charging vehicle to the server. As discussed above, the selection may be made by the vehicle or by the vehicle user.

In block 314, the current vehicle may receive additional vehicle data corresponding to the selected/charging vehicle. In some embodiments, this additional data may have been previously received as the available vehicle data. The additional vehicle data may include a location of the charging vehicle, navigation instructions to the charging vehicle, or the like. The additional vehicle data may further include an amount of electrical energy that is available, a cost of the electrical energy, or the like.

In block 316, the current vehicle (or a mobile device associated with the current vehicle) may receive digital key information. As discussed above, the digital key information may be used to access at least a portion of the charging vehicle (e.g., the charge port). The digital key information may be stored in a memory of the vehicle, in a memory of the mobile device, or the like.

In some embodiments, the current vehicle may be tasked with autonomously obtaining a charge. In such embodiments and in block 318, the vehicle may autonomously travel to the current location of the charging vehicle (or to a predetermined meeting location). The vehicle may autonomously travel to the charging vehicle based on the received current location of the charging vehicle, based on the received navigation instructions, or the like.

In block 320, the vehicle (or a user of the vehicle) may access a charge port of the charging vehicle to receive electrical energy. For example, the vehicle may transmit the digital key information wirelessly to the charging vehicle to allow access to the charge port. As another example, the mobile device of the user may transmit the digital key information to the charging vehicle to facilitate access to the charge port. In some embodiments, use of the digital key allows access to the charge port such that the user may connect a charging cable to the charge port of the charging vehicle and the current vehicle to allow electrical transfer from the charging vehicle to the current vehicle.

In some embodiments, the charging vehicle (and the current vehicle) may be capable of wireless power transfer (e.g., inductive charging). In such embodiments, either the user may drive the current vehicle to be in range of the wireless charger of the charging vehicle, or the current vehicle may autonomously travel within the range (and specific location of charging) of the wireless charger of the charging vehicle. In this manner, the current vehicle may autonomously retrieve the electrical energy from the charging vehicle.

In some embodiments, one or both of the charging vehicle or the current vehicle may include charging contacts and a robot arm (which may include any one or more actuator) coupled thereto. The vehicle(s) with the robot arm may actuate the robot arm such that the charging contacts make electrical contact with a charge port (or corresponding electrical contacts) of the other vehicle to facilitate the transfer of the electrical energy. In this manner again, the current vehicle may autonomously retrieve the electrical energy from the charging vehicle.

In some embodiments, the charging vehicle may travel to the current location of the current vehicle. In such embodiments, the autonomous travel and charging may be performed in a similar manner as described above.

In block 322, the current vehicle may receive a notification from the server that a requesting vehicle will be accessing the charge port of the current vehicle. This notice may include an amount of electricity to be provided to the requesting vehicle, a time at which the requesting vehicle will arrive, whether autonomous charging is desirable, a one-time digital key to facilitate access to the charge port of the current vehicle, or the like.

In block 324, the current vehicle may receive digital key information from the requesting vehicle (or from a mobile device associated with a user of the requesting vehicle). The digital key information may be received via a wireless protocol such as Bluetooth, Wi-Fi, radio-frequency identification (RFID), or the like. In response to receiving the digital key information, the current vehicle may allow access to a charge port of the current vehicle (or to another charging feature such as charging contacts or a wireless charger).

In block 326, the current vehicle may transfer electrical energy from a battery of the current vehicle to the requesting vehicle. As discussed above, this may be performed using electrical cables, wireless charging, contact between electrical contacts, or the like. The vehicle may cease transferring the electrical energy in response to the transferred amount being equal to or greater than the requested (or assigned) amount of energy transfer.

In block 328, the current vehicle (or the requesting vehicle, or previous charging vehicle) may transmit quantity information to the server. The quantity information corresponds to an amount of the electrical energy that was transferred between the vehicles. The quantity information may be used by the server to charge an account of the requesting vehicle and to debit an account of the charging vehicle.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for electrical charging of a first vehicle by a second vehicle, the system comprising:
    a network access device configured to communicate with a first source that includes at least one of the first vehicle or a mobile device associated with a user of the first vehicle;
    a memory configured to store charging preferences associated with the first source; and
    a processor coupled to the network access device and the memory and configured to:
        receive, via the network access device, a charge request from the first source, the charge request requesting access to a source of electrical energy for charging the first vehicle,
        rank the stored charging preferences based on prior interactions of the first source;
        identify an available vehicle that is available to be used as the source of electrical energy for charging the first vehicle based on the ranked stored charging preferences, and
        transmit, via the network access device, available vehicle information corresponding to the available vehicle to the first source in response to receiving the charge request.

2. The system of claim 1 wherein the available vehicle information includes a location of the available vehicle.

3. The system of claim 1 wherein the processor is further configured to:
    determine digital key information corresponding to the available vehicle; and
    transmit, via the network access device, the digital key information to the first source to allow access to a charge port of the available vehicle.

4. The system of claim 1 wherein the processor is further configured to:
    determine digital key information corresponding to the first vehicle; and
    transmit, via the network access device, the digital key information to the available vehicle or to a second mobile device associated with a second user of the available vehicle to allow access to a charge port of the first vehicle.

5. The system of claim 1 wherein the processor is further configured to:
    identify a plurality of available vehicles including the available vehicle;
    transmit, via the network access device, additional available vehicle data corresponding to each of the plurality of available vehicles; and
    receive, via the network access device, a selection of the available vehicle from the first source.

6. The system of claim 1 wherein the processor is further configured to:
    identify a plurality of available vehicles including the available vehicle; and
    select the available vehicle from the plurality of available vehicles based on at least one of:
        a current location of the first vehicle and current locations of each of the plurality of available vehicles,
        a state of charge (SOC) of each of the plurality of available vehicles, or
        a current route of the first vehicle.

7. The system of claim 1 wherein:
    the available vehicle is autonomous or semi-autonomous; and
    the processor is further configured to transmit, via the network access device and to the available vehicle, at least one of:
        navigation instructions from a current location of the available vehicle to a current location of the first vehicle, or
        the current location of the first vehicle such that the available vehicle can autonomously travel to the current location of the first vehicle to charge the first vehicle.

8. The system of claim 1 wherein at least one of the first vehicle or the available vehicle is autonomous or semi-autonomous, and includes at least one of:
- a wireless charging port configured to wirelessly transmit or receive the electrical energy, or
- an actuator configured to actuate a charging contact to make contact with a corresponding charging contact of the other of the first vehicle or the available vehicle.

9. The system of claim 1 wherein:
the memory is further configured to store preferences for each of a plurality of available vehicles including the available vehicle, the preferences including at least one of a minimum state of charge (SOC) corresponding to a minimum SOC for each of the plurality of available vehicles, geographical area information corresponding to a geographical area in which each of the plurality of available vehicles is available to travel to charge the first vehicle, time information corresponding to times at which each of the plurality of available vehicles is available to charge the first vehicle, or cost information corresponding to an amount of payment that each of the plurality of available vehicles will sell each unit of the electrical energy; and
the processor is further configured to identify the available vehicle from the plurality of available vehicles based on the stored preferences.

10. The system of claim 1 wherein:
the memory is further configured to store account information including at least one of payment information corresponding to the user of the first vehicle or loyalty points corresponding to the user of the first vehicle; and
the processor is further configured to:
receive, via the network access device, quantity information corresponding to a quantity of the electrical energy provided from the available vehicle to the first vehicle, and
collect payment for the quantity of the electrical energy using the account information.

11. The system of claim 1 wherein the available vehicle is an autonomous vehicle and includes at least one of a fuel cell circuit configured to generate the electrical energy via a chemical reaction or a generator configured to convert fuel into the electrical energy such that the available vehicle is capable of providing a greater quantity of electrical energy than is stored in an available vehicle battery of the available vehicle.

12. A system for electrical charging of a first vehicle, the system comprising:
a remote server configured to:
store, in a memory, charging preferences associated with the first vehicle, and
rank the stored charging preferences based on prior interactions of the first vehicle;
a battery having a state of charge (SOC) and configured to receive electrical energy;
a network access device configured to communicate with the remote server; and
an electronic control unit (ECU) coupled to the battery and the network access device and configured to:
transmit, via the network access device, a charge request to the remote server requesting access to a source of electrical energy for charging the battery, and
receive, via the network access device and from the remote server, available vehicle information based on the ranked stored charging preferences, the available vehicle information corresponding to an available vehicle that is available to be used as the source of electrical energy for charging the battery.

13. The system of claim 12 wherein the available vehicle information includes a location of the available vehicle along with digital key information corresponding to the available vehicle and usable to provide access to a charge port of the available vehicle.

14. The system of claim 12 wherein the ECU is further configured to:
receive, via the network access device and from the remote server, additional available vehicle data corresponding to each of a plurality of available vehicles;
identify a preferred available vehicle based on at least one of:
a current location of the first vehicle and current locations of each of the plurality of available vehicles,
a state of charge (SOC) of each of the plurality of available vehicles, or
a current route of the first vehicle; and
transmit, via the network access device, an identifier of the preferred available vehicle to the remote server.

15. The system of claim 12 wherein:
the available vehicle information includes at least one of:
a location of the available vehicle, or
navigation instructions from a current location of the first vehicle to the location of the available vehicle; and
the ECU is further configured to autonomously control the first vehicle to travel to the location of the available vehicle based on the available vehicle information.

16. The system of claim 15 further comprising at least one of:
a wireless charge port configured to receive a wireless electrical energy signal, or
a charging contact and a robot arm coupled to the charging contact and configured to actuate the charging contact to make contact with an external charging contact,
wherein the ECU is further configured to control the at least one of the wireless charge port or the robot arm to be positioned in a way to receive the electrical energy from the available vehicle.

17. A method for electrical charging of a first vehicle by a second vehicle, the method comprising:
receiving, by a network access device and from a first source that includes at least one of the first vehicle or a mobile device associated with a user of the first vehicle, a charge request requesting access to a source of electrical energy for charging the first vehicle;
storing, in a memory, charging preferences associated with the first source;
ranking, by a processor coupled to the network access device and the memory, the stored charging preferences based on prior interactions of the first source;
identifying, by the processor, an available vehicle that is available to be used as the source of electrical energy for charging the first vehicle based on the ranked stored charging preferences; and
transmitting, by the processor and via the network access device, available vehicle information corresponding to the available vehicle to the first source in response to receiving the charge request.

18. The method of claim 17 further comprising:
determining, by the processor, digital key information corresponding to the available vehicle; and transmitting, by the processor and via the network access device, the digital key information to the first source to allow access to a charge port of the available vehicle.

19. The method of claim 17 further comprising:
identifying, by the processor, a plurality of available vehicles including the available vehicle;
transmitting, by the processor and via the network access device, additional available vehicle data corresponding to each of the plurality of available vehicles; and
receiving, by the processor and via the network access device, a selection of the available vehicle from the first source.

20. The method of claim 17 further comprising:
identifying, by the processor, a plurality of available vehicles including the available vehicle; and
selecting, by the processor, the available vehicle from the plurality of available vehicles based on at least one of:
  a current location of the first vehicle and current locations of each of the plurality of available vehicles,
  a state of charge (SOC) of each of the plurality of available vehicles, or
  a current route of the first vehicle.

* * * * *